United States Patent
Itagaki et al.

(10) Patent No.: US 7,415,165 B2
(45) Date of Patent: Aug. 19, 2008

(54) RED-EYE DETECTION DEVICE, RED-EYE DETECTION METHOD, AND RED-EYE DETECTION PROGRAM

(75) Inventors: Kazuyuki Itagaki, Kanagawa-ken (JP); Wataru Ito, Kanagawa-ken (JP); Takafumi Matsushita, Kawasaki (JP)

(73) Assignee: FUJIFILM Corporation, Tokyo (JP)

( * ) Notice: Subject to any disclaimer, the term of this patent is extended or adjusted under 35 U.S.C. 154(b) by 483 days.

(21) Appl. No.: 11/092,571

(22) Filed: Mar. 29, 2005

(65) Prior Publication Data

US 2005/0232490 A1    Oct. 20, 2005

(30) Foreign Application Priority Data

Mar. 30, 2004   (JP)   ............................. 2004-099934
Mar. 28, 2005   (JP)   ............................. 2005-092049

(51) Int. Cl.
    *G06K 9/36*    (2006.01)
    *G06K 9/00*    (2006.01)
(52) U.S. Cl. ....................................... 382/282; 382/167
(58) Field of Classification Search ................. 382/162, 382/167, 190, 254, 260, 274, 275, 282; 358/518, 358/520
    See application file for complete search history.

(56) References Cited

U.S. PATENT DOCUMENTS

| 6,204,858 | B1 * | 3/2001 | Gupta | 345/600 |
| 6,252,976 | B1 | 6/2001 | Schildkraut et al. | |
| 6,292,574 | B1 * | 9/2001 | Schildkraut et al. | 382/117 |
| 7,174,034 | B2 * | 2/2007 | O'Callaghan | 382/117 |
| 2005/0047655 | A1 * | 3/2005 | Luo et al. | 382/167 |
| 2005/0047656 | A1 * | 3/2005 | Luo et al. | 382/167 |

FOREIGN PATENT DOCUMENTS

| JP | 2000-13680 A | 1/2000 |
| JP | 2001-148780 A | 5/2001 |

* cited by examiner

*Primary Examiner*—Colin LaRose
(74) *Attorney, Agent, or Firm*—Birch, Stewart, Kolasch & Birch, LLP

(57) ABSTRACT

A red-eye detection device includes a red-eye candidate detection section, a red-eye pair specification section, and an isolated red-eye candidate check section. The red-eye candidate detection section detects a red-eye candidate that can be estimated to be a red-eye, by identifying a feature of the pupil that has a region displayed red from among features of an image. The red-eye pair specification section specifies the red-eye candidate as a pair of a right red-eye candidate equivalent to a right eye and a left red-eye candidate equivalent to a left eye, using information on a face region obtained from the image. The isolated red-eye candidate check section checks whether an isolated red-eye candidate, detected by the red-eye candidate detection section but not specified as the pair by the red-eye pair specification section, is a true red-eye.

12 Claims, 9 Drawing Sheets

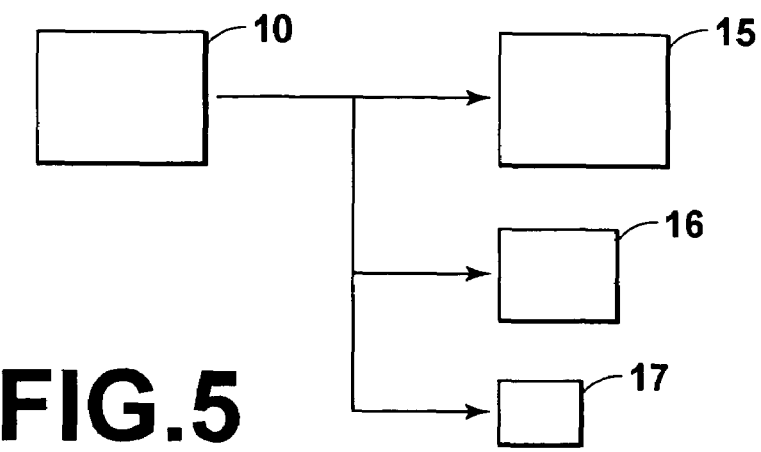
FIG.5
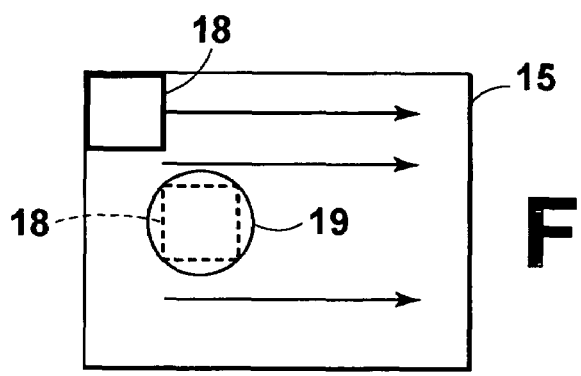
FIG.6A
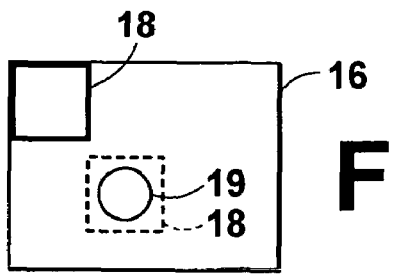
FIG.6B
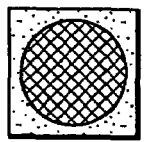 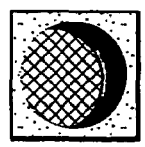 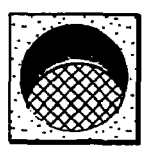
FIG.7A　FIG.7B　FIG.7C

FIG.11
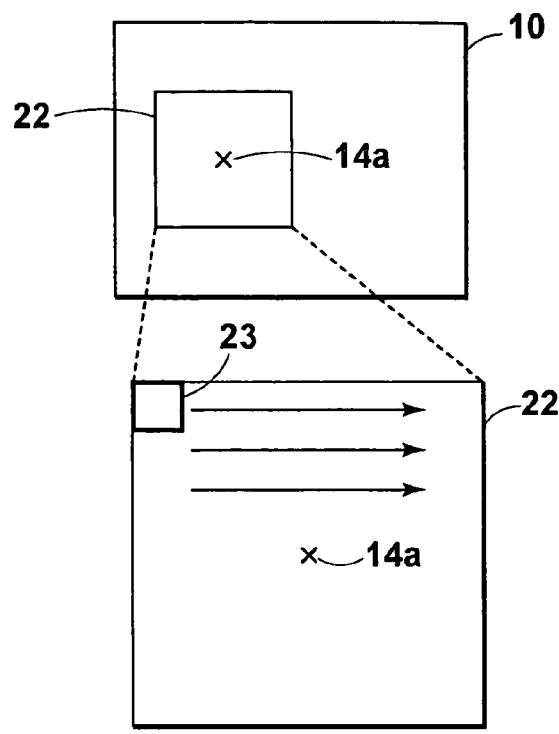
FIG.12A FIG.12B FIG.12C
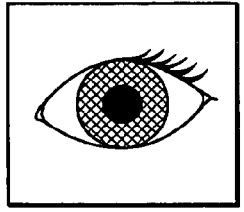 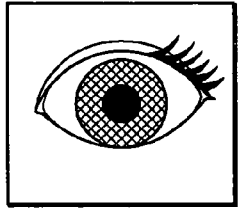 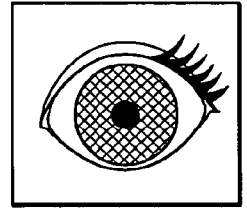
FIG.12D FIG.12E
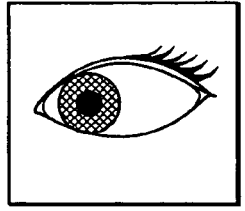 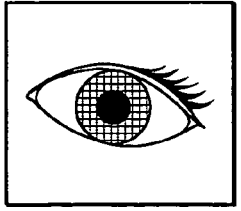

FIG.14A
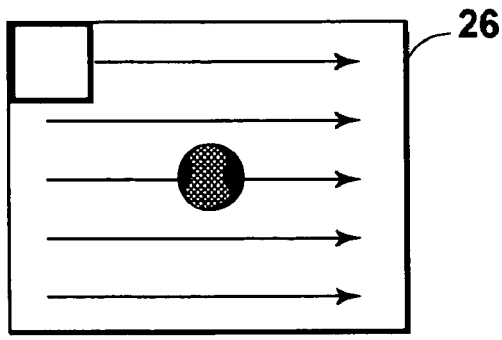
FIG.14B
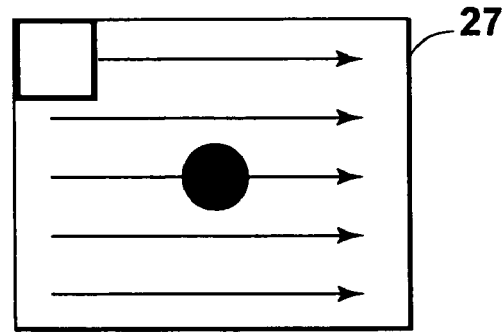
FIG.15
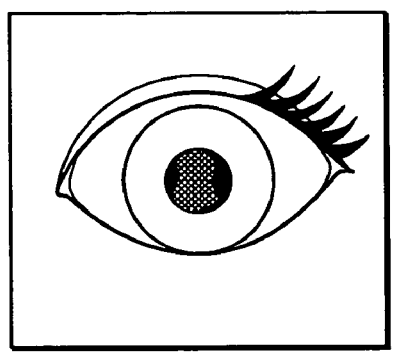
PIXEL EXTRACTION
 SHAPING
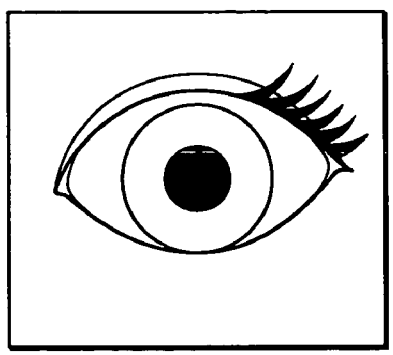
COLOR REPLACEMENT

RED-EYE DETECTION DEVICE, RED-EYE DETECTION METHOD, AND RED-EYE DETECTION PROGRAM

BACKGROUND OF THE INVENTION

1. Field of the Invention

The present invention relates generally to the process of detecting a correction object when performing local color correction on a photographic image, and more particularly to a red-eye detection device, a red-eye detection method, and a red-eye detection program that detect red parts from a photographic image in which eyes are photographed red.

2. Description of the Related Art

If a flash photograph of a person or animal is taken at night or in poor light, there are cases where the pupil (or part of the pupil) will be photographed as red or gold. For this reason, a variety of methods have been proposed in which the pupil photographed as red or gold (hereinafter referred to as a red-eye, including the case of gold) is corrected to the original color, by digital image processing.

For example, Japanese Unexamined Patent Publication No. 2000-013680 discloses a method of and a device for automatically recognizing a red-eye from among regions specified by an operator, based on the color, position, and size of the pupil. Also, Japanese Unexamined Patent Publication No. 2001-148780 discloses a method of calculating a predetermined feature quantity of each pixel for a region specified by an operator and selecting as a correction object a part that has the most distinguishing feature of the pupil. However, in the recognition process based on only features of the pupil, it is difficult to discriminate a locally reddish object such as a red electrical decoration from a red-eye. Because of this, it is extremely difficult to automatically perform all operations without human intervention by an operator.

In contrast with this, a method of automatically detecting a red-eye is shown in U.S. Pat. No. 6,252,976 (corresponding to Japanese Publication No. 2000-125320). In this method, a face is detected and, based on features of the face, a pair of the right eye and the left eye is specified from among detected red-eye candidates. Then, based on the features of the face, it is evaluated whether or not the pair meets conditions of a red-eye. For instance, since a distance between both eyes is obtained from the size of the face, the upper limit of the size of the pupil is estimated from that distance, and it is confirmed that the size of a red-eye candidate detected does not exceed the upper limit. In this manner, accuracy of detection is enhanced. This method is effective when both eyes are red-eyes.

However, the phenomenon of a red-eye does not necessarily occur in both eyes. There are cases in which only one eye becomes a red-eye. In addition, when both eyes are red-eyes, there are cases where only one of the two eyes is detected as a red-eye candidate.

In the method disclosed in U.S. Pat. No. 6,252,976, the evaluation of whether candidates meet conditions of a red-eye cannot be performed on red-eye candidates not specified as a pair. In this case, the judgment of whether to make a correction must be performed based on the result of detection, whose accuracy is low. As a result, objects other than a red-eye will be corrected. Also, when both eyes are red-eyes, only one eye will be corrected.

SUMMARY OF THE INVENTION

The present invention has been made in view of the circumstances described above. Accordingly, it is the primary object of the present invention to provide a red-eye detection device, a red-eye detection method, and a red-eye detection program that are capable of accurately detecting a red-eye when only one eye is a red-eye, or even in the case where only one eye is detected as a red-eye candidate when both eyes are red-eyes.

A red-eye detection device of the present invention is a device for detecting from an image a red-eye in which at least part of the pupil is displayed red. The red-eye detection device comprises a red-eye candidate detection section, a red-eye pair specification section, and an isolated red-eye candidate check section.

The aforementioned red-eye candidate detection section detects a red-eye candidate that can be estimated to be a red-eye, by identifying a feature of the pupil that has a region displayed red from among features of the image. The "feature of the pupil that has a region displayed red" is not limited to features specific to pupils having regions displayed red, and includes any feature that serves as a reference in judging likelihood of being red eye. For example, the feature "displayed red" is a feature which can be seen in regions other than a "pupil that has a region displayed red". However, this feature is also included within the "feature of the pupil that has a region displayed red". In the detection of a red-eye, all features of the red-eye do not necessarily need to be used. That is, a red-eye may be detected by using only a feature that is considered particularly effective in detecting the red-eye. For example, a candidate may be estimated to be red eye, based solely on the feature "displayed red".

The aforementioned red-eye pair specification section specifies the red-eye candidate as a pair, of a right red-eye candidate equivalent to a right eye and a left red-eye candidate equivalent to a left eye, using information on a face region obtained from the image. The information on a face region refers to information on the position, size, etc., of a face within an image.

The aforementioned isolated red-eye candidate check section checks whether an isolated red-eye candidate, detected by the red-eye candidate detection section but not specified as the pair by the red-eye pair specification section, is a true red-eye. More specifically, the isolated red-eye candidate check section checks whether the isolated red-eye candidate is a true red-eye, by whether a feature of an eye can be identified from among features of an image containing the isolated red-eye candidate. For instance, when the other eye differing from an eye containing a red-eye candidate is detected, the red-eye candidate may be judged a true red-eye. Also, when a red-eye candidate itself is part of an eye, it may be judged a true red-eye.

The aforementioned isolated red-eye candidate check section may check whether the isolated red-eye candidate is the red eye, by whether the feature of the pupil having a region displayed red can be re-identified from among features of an image containing the isolated red-eye candidate. The re-identification by the isolated red-eye candidate check section is preferably higher in accuracy of identification than the identification by the red-eye candidate detection section. The identification accuracy may be varied by enhancing the accuracy of detectors used in the identification process, or by adjusting a threshold value at the time of judgment.

A red-eye detection method of the present invention is a method of detecting from an image a red-eye in which at least part of the pupil is displayed red. The red-eye detection method comprises three major steps: (1) a red-eye candidate detection step of detecting a red-eye candidate that can be estimated to be the red-eye, by identifying a feature of the pupil that has a region displayed red from among features of the image; (2) a red-eye pair specification step of specifying the red-eye candidate as a pair of a right red-eye candidate equivalent to a right eye and a left red-eye candidate equivalent to a left eye, using information on a face region obtained from the image; and (3) an isolated red-eye candidate check step of checking whether an isolated red-eye candidate, detected as the red-eye candidate but not specified as the pair, is a true red-eye.

A red-eye detection program of the present invention is a program for causing a computer to carry out a process of detecting from an image a red-eye in which at least part of the pupil is displayed red. The program causes the computer to carry out: (1) a red-eye candidate detection process of detecting a red-eye candidate that can be estimated to be the red-eye, by identifying a feature of the pupil that has a region displayed red from among features of the image; (2) a red-eye pair specification process of specifying the red-eye candidate as a pair of a right red-eye candidate equivalent to a right eye and a left red-eye candidate equivalent to a left eye, using information on a face region obtained from the image; and (3) an isolated red-eye candidate check process of checking whether an isolated red-eye candidate, detected as the red-eye candidate but not specified as the pair, is a true red-eye.

According to the red-eye detection device, red-eye detection method, and red-eye detection program of the present invention, it is checked whether an isolated red-eye candidate not detected as a red-eye pair is a true red-eye. Therefore, even when only one eye is a red-eye, when one of both red-eyes is not detected in the first detection process, or when an electrical decoration, for example, is erroneously detected as a red-eye in the first detection process, only a true red eye can be extracted by the checking process.

Therefore, if a red-eye is retouched by employing the results of detection obtained by the red-eye detection device, red-eye detection method, and red-eye detection program of the present invention, incomplete retouching and erroneous retouching are prevented. That is, the present invention can prevent one eye from becoming a black eye and the other eye from becoming a red-eye and also prevent an electrical decoration, etc., from being judged as eye's color.

If whether a red-eye candidate constitutes part of an eye, or whether the other eye is present near a red-eye candidate, is identified from an image containing the red-eye candidate, and checking is performed based on the result, erroneous detection, such as detection of electrical decorations, etc., can be reliably excluded.

According to the present invention, the red-eye candidate detection process is performed again on a limited image that contains a red-eye candidate, with higher accuracy than the first red-eye candidate detection process. Therefore, when an eye other than a red-eye is recognized in error as a red-eye candidate, the result of detection can be corrected before it is output.

Note that the program of the present invention may be provided being recorded on a computer readable medium. Those who are skilled in the art would know that computer readable media are not limited to any specific type fo device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

BRIEF DESCRIPTION OF THE DRAWINGS

The present invention will be described in further detail with reference to the accompanying drawings wherein:

FIG. 5 is a diagram used to explain a resolution-classified image;

FIG. 6, which includes FIGS. 6A and 6B, is a diagram showing an object range set process and a red-eye identification process;

FIG. 7, which includes FIGS. 7A, 7B, and 7C, is a diagram showing samples used in a learning operation by a red-eye candidate detector;

FIG. 11 is a diagram used to explain the process of searching for an eye;

FIG. 12, which includes FIGS. 12A to 12E, is a diagram showing an eye sample used in a learning operation by an eye detector;

FIG. 13, which includes

FIG. 14, which includes FIGS. 14A and 14B, is a diagram used to explain the red-eye candidate detection process; and FIG. 15 is a diagram showing an overview of the processing by the red-eye retouch device shown in FIG. 1.

DESCRIPTION OF THE PREFERRED EMBODIMENTS

Figure 1:
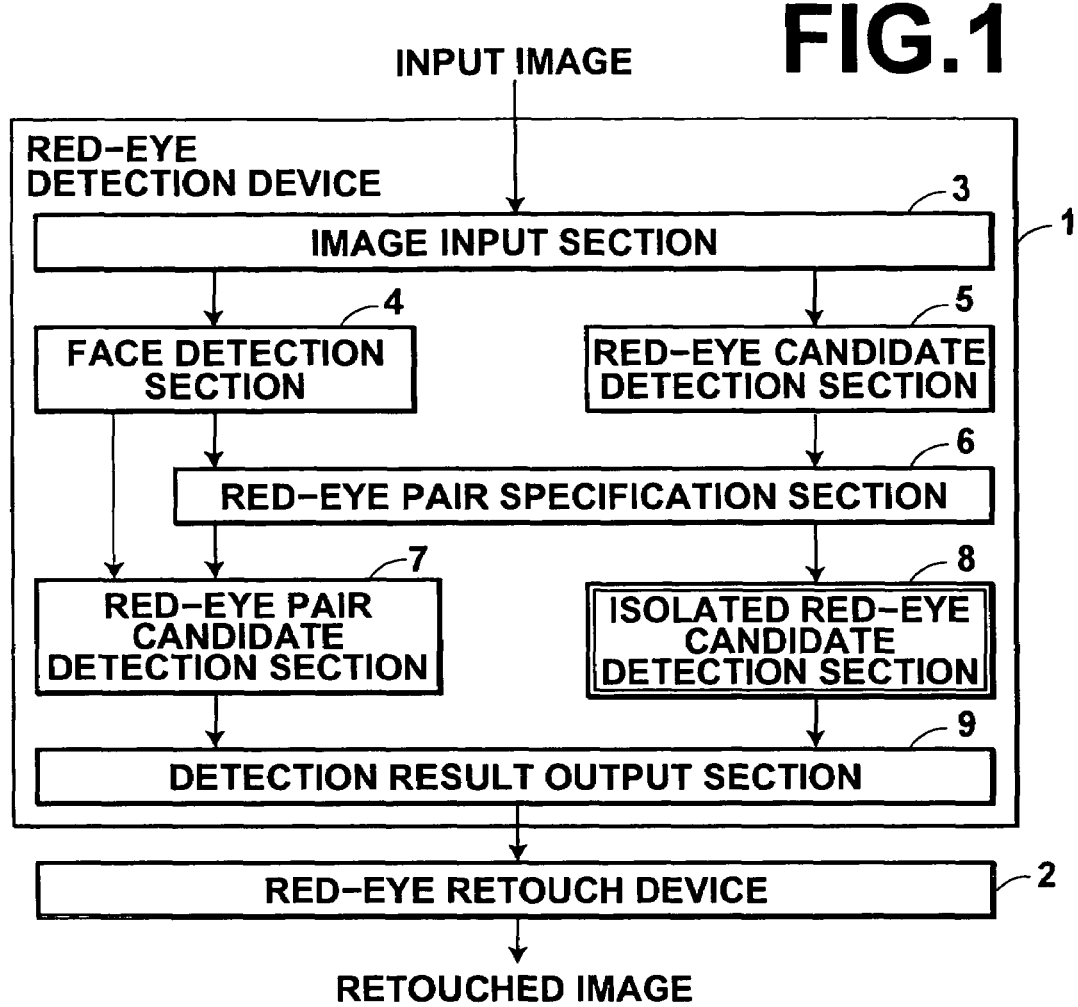
FIG. 1 is a block diagram showing a red-eye correction system that includes a red-eye detection device and a red-eye retouch device.

Referring now to FIG. 1, there is shown a red-eye correction system. This system includes a red-eye detection device 1, which is constructed in accordance with a preferred embodiment of the present invention, and a red-eye retouch device 2. The red-eye retouch device 2 is a device that performs a local color correction on an image so that the color of a red-eye detected by the red-eye detection device 1 becomes the original color of the pupil, and outputs a retouched image.

As shown in FIG. 1, the red-eye detection device 1 is equipped with an image input section 3 for receiving an input image; a face detection section 4 for detecting a region that is estimated to be a face from the input image; and a red-eye candidate detection section 5 for detecting a red-eye candidate that is estimated to be a red-eye from the input image. The red-eye detection device 1 is also equipped with a red-eye pair specification section 6. The red-eye pair specification section 6 provides the function of specifying a pair of right and left eyes from the red-eye candidates detected by the red-eye candidate detection section 5, using information on the face region detected by the face detection section 4.

The red-eye detection device 1 is further equipped with a red-eye pair candidate check section 7 for checking the result obtained by the red-eye pair specification section 6, and an isolated red-eye candidate check section 8. The red-eye pair candidate check section 7 provides the function of checking whether the red-eye candidate pair specified by the red-eye pair specification section 6 are red-eyes. The isolated red-eye candidate check section 8 provides the function of checking whether, among red-eye candidates detected by the red-eye candidate detection section 5, the red-eye candidate not specified as a pair by the red-eye pair specification section 6 (referred to as an isolated red-eye candidate) is a true red-eye.

The red-eye detection device 1 is further equipped with a detection result output section 9 for outputting a list of red-eye candidates decided to be a true red-eye by either the red-eye pair candidate check section 7 or the isolated red-eye candidate check section 8, as a list of red-eyes detected.

The above-described sections of the red-eye detection device 1 are realized by software programs. Therefore, the red-eye detection device 1 is equipped with storage means for storing programs and image data, and calculating means for carrying out the stored programs. The appearance and size of the red-eye detection device 1 do not matter so much. The above-described sections of the red-eye detection device 1 may share common calculating means and storage means, or each section may be equipped with dedicated calculating means and storage means.

More specifically, if a red-eye detection program is installed in a general-purpose computer equipped with a CPU, memory, a hard disk, and other input/out interfaces, the general-purpose computer can function as the red-eye detection device 1.

In addition, when a dedicated machine like a digital photograph printer can carry out a red-eye detection program installed therein, the red-eye detection function can be added to that machine.

The red-eye detection function can also be installed in a memory-logic mounted semiconductor device. For instance, if such a memory-logic mounted semiconductor device is mounted in a digital camera, it can function as a camera with a built-in red-eye detection function.

Thus, the red-eye detection device 1 can have various appearances and hardware constructions, so it is not particularly limited in appearance and construction. As previously described, the processes to be carried out by the red-eye detection program constitute the central feature of the red-eye detection device 1 of the preferred embodiment. Therefore, the processing by the red-eye detection program will hereinafter be described.

Figure 2:
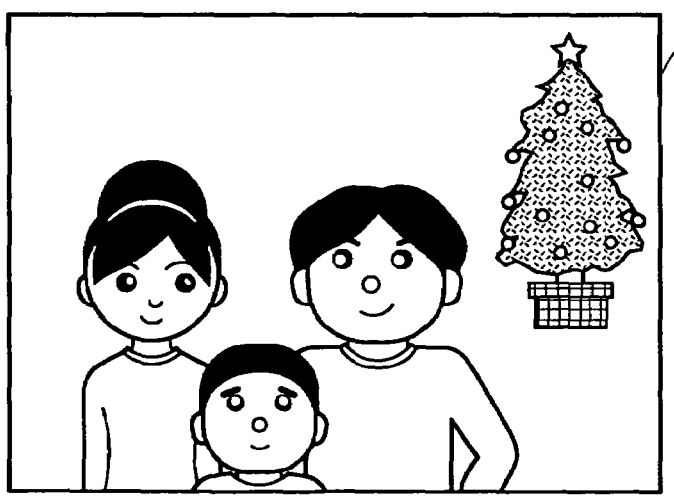
FIG. 2 is a diagram showing an input image acquired by the image input section of the red-eye detection device shown in FIG. 1.

In FIG. 2, an image 10 with three persons and an electrically decorated Christmas tree is shown as an example of an input image. A description will hereinafter be given of how the image 10 is to be processed by the red-eye detection program. The image 10 acquired by the image input section 3 is input to the face detection section 4 and red-eye candidate detection section 5, as previously described.

Figure 3A:
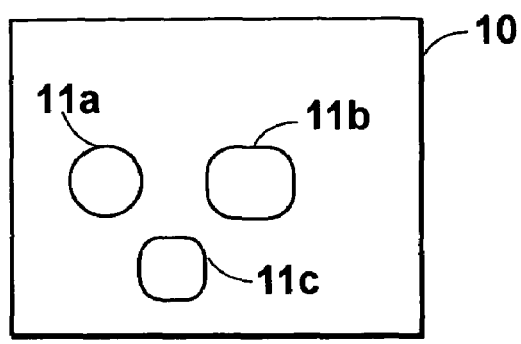
FIG. 3A is a diagram showing the state in which the face regions of the three persons in the input image are detected by the face detection section of the red-eye detection device shown in FIG. 1.

The face detection section 4 carries out a process of detecting a face region, based on the color, density, etc., of each pixel constituting the image 10, as shown in FIG. 3A. In the figure, the face regions 11a, 11b, and 11c of the three persons in the image 10 detected by the face detection section 4 are shown. The face regions 11a, 11b, and 11c can be detected, for example, by employing well-known image recognition techniques such as the method disclosed in the aforementioned Publication No. 2000-125320. That is, the present invention is not particularly limited regarding the image recognition technique to be employed.

Figure 3B:
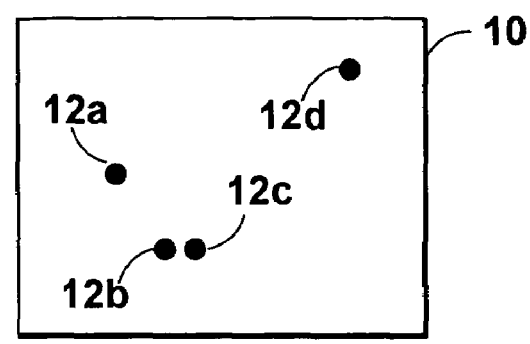
FIG. 3B is a diagram showing the state in which red-eye candidates are detected by the red-eye candidate detection section of the red-eye detection device shown in FIG. 1.

The red-eye candidate detection section 5 carries out a process of detecting a red-eye candidate that is estimated to be a red-eye, as shown in FIG. 3B. In the figure, among the three persons in the image 10, one eye of the left person and both eyes of the central person are detected as red-eye candidates 12a, 12b, and 12c, and one of the Christmas tree decorations is erroneously detected as a red-eye candidate 12d.

The red-eye candidates can also be detected by employing well-known detection techniques such as the methods disclosed in the aforementioned Publication Nos. 2000-13680 and 2000-148780. That is, the present invention is not particularly limited regarding the detection technique to be employed. However, since the red-eye candidate detection process relates to the red-eye candidate check process to be described later, the processing steps to be carried out by the red-eye candidate detection section 5 of the red-eye detection device 1 of the preferred embodiment will hereinafter be described in detail.

Figure 4:
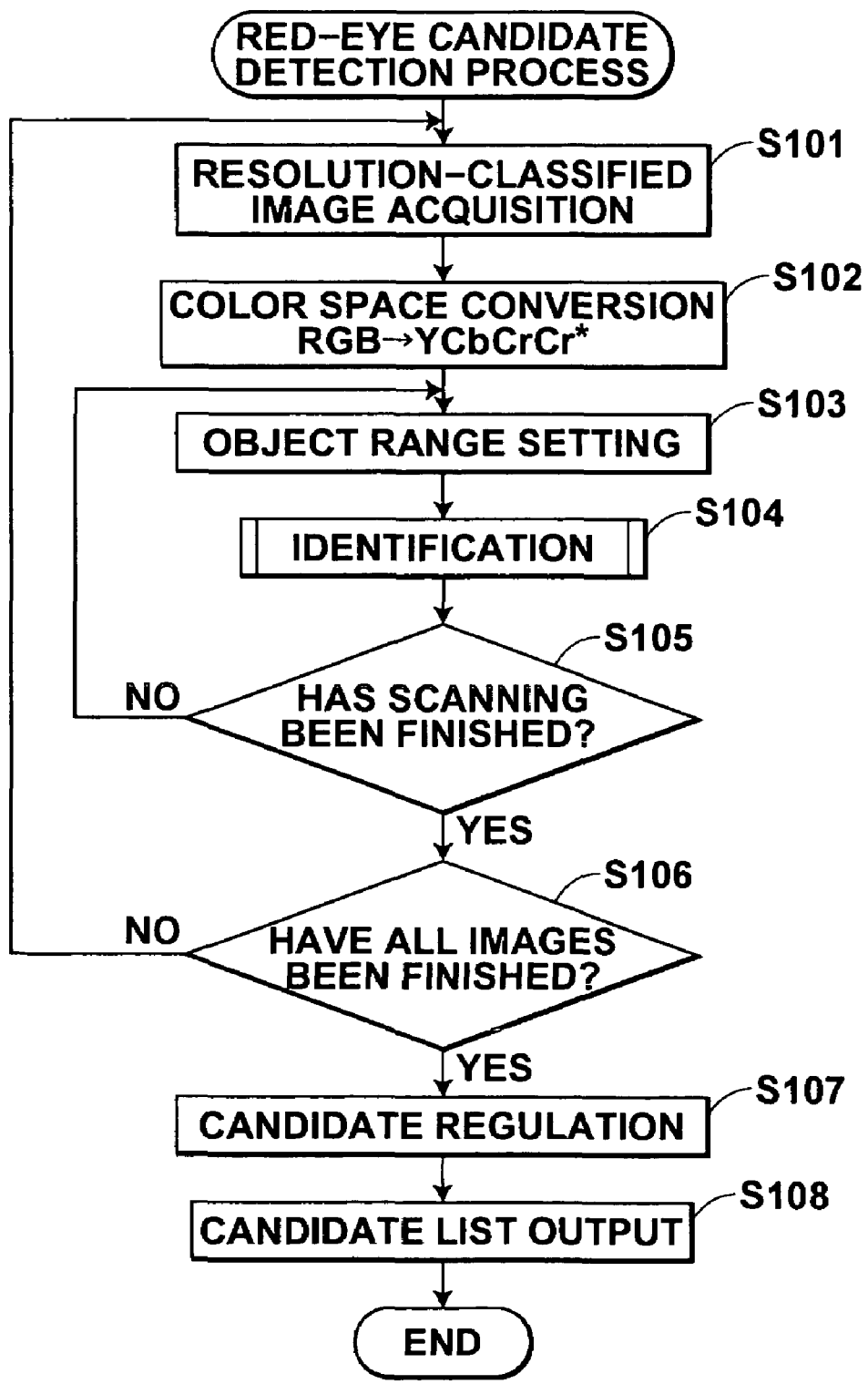
FIG. 4 is a flowchart showing the essential steps of a red-eye candidate detection process performed by the red-eye candidate detection section of the red-eye detection device shown in FIG. 1.

FIG. 4 shows the essential steps of the red-eye candidate detection process. The red-eye candidate detection section 5 first acquires a resolution-classified image (S101). FIG. 5 is a diagram used to explain a resolution-classified image. As shown in the figure, in the preferred embodiment, a first image 15 with resolution of the same as the input image 10, a second image 16 with resolution of one-half of the input image 10, and a third image 17 with resolution of one-fourth of the input image 10 are previously generated and stored in memory.

The first image 15 that is the same in resolution as the input image 10 is generated by copying the input image 10. On the other hand, the second and third images 16, 17, different in resolution from the input image 10, a regenerated by performing a pixel thinning-out process (in which the number of pixels is reduced) on the input image 10. In step S101 of FIG. 4, the red-eye candidate detection section 5 acquires one resolution-classified image by reading it out from memory.

The red-eye candidate detection section 5 then performs a color space conversion process on the acquired resolution-classified image (S102). More specifically, the red-eye candidate detection section 5 converts the color system of the resolution-classified image by converting the values of the red (R), green (G), and blue (B) of each pixel that constitutes the resolution-classified image to the values of Y (luminance), $C_b$ (color difference between G and B), $C_r$ (color difference between G and R), and $C_r^*$ (color difference between G and R), using a predetermined conversion equation.

Y, $C_b$, and $C_r$ are a coordinate system used in Joint Photographic Experts Group (JPEG) images and $C_r^*$ is a coordinate axis representing a direction where red color and flesh color are separated best from each other in the RGB space. The direction of the coordinate axis is previously determined by applying a linear discriminant method to red and flesh color samples. If such a coordinate axis is defined, detection accuracy for red-eye candidates can be enhanced compared with the case where detection is performed in the $YC_bC_r$ space.

Subsequently, the red-eye candidate detection section 5 sets a judging-object range over the image on which the color space conversion process is performed (S103). The red-eye candidate detection section 5 then performs a red-eye candidate identification process on the judging-object range (S104). The object range set process of step S103 and the red-eye candidate identification process of step S104 are shown in FIG. 6.

FIG. 6A shows the state in which a judging-object range 18 is set over the resolution-classified image 15, on which the color space conversion process is performed in step 102. In the preferred embodiment, the judging-object range 18 is a region of 13 pixels×13 pixels, but for the sake of convenience of explanation, it is shown on an enlarged scale.

In the identification process, an image contained in the set judging-object range 18 is detected by a plurality of red-eye candidate detectors. From a combination of detection results obtained by the detectors, it is judged whether the image in the judging-object range 18 can be estimated to be a red-eye. If it can be estimated to be a red-eye, that region is detected as a red-eye candidate.

The red-eye candidate detector refers to a combination of (1) a parameter for calculating a feature quantity that is effective in discriminating between a red-eye and a non-red eye, (2) an identifier for outputting an identification point that represents a probability of a red-eye with the calculated feature quantity as input, and (3) a threshold value determined to maintain a predetermined accurate detection ratio by applying the parameter and identifier to a great number of red-eye samples and then calculating the value of the accumulated identification point.

The aforementioned parameter and identifier are determined by previously performing learning, using a great number of red-eye samples and non-red eye samples. Learning is performed by employing well-know methods such as a neural network method known as a machine learning technique, a boosting method, etc.

Samples to be used in learning preferably include a predetermined variation in the size of a red region relative to a unit rectangle, such as a sample with a red region of 100% of the pupil, a sample with a red region of 80% of the pupil, and a sample with a red region of 60% of the pupil, as shown in FIGS. 7A, 7B, and 7C, If samples for learning contain samples in which the center of a red region is shifted from the center of a unit rectangle, even red regions in a shifted state can be extracted. Therefore, even if the spacing between samples is made wider when setting the judging object range on an image and scanning the image with the range, accuracy of extraction can be maintained and processing time can be shortened.

The aforementioned threshold value is preferably determined so as to perform accurate detection at a predetermined probability or greater, by applying feature-quantity calculating parameters and identifiers determined by a learning operation to as many red-eye samples as possible and calculating the value of the accumulated identification point.

Figure 8:
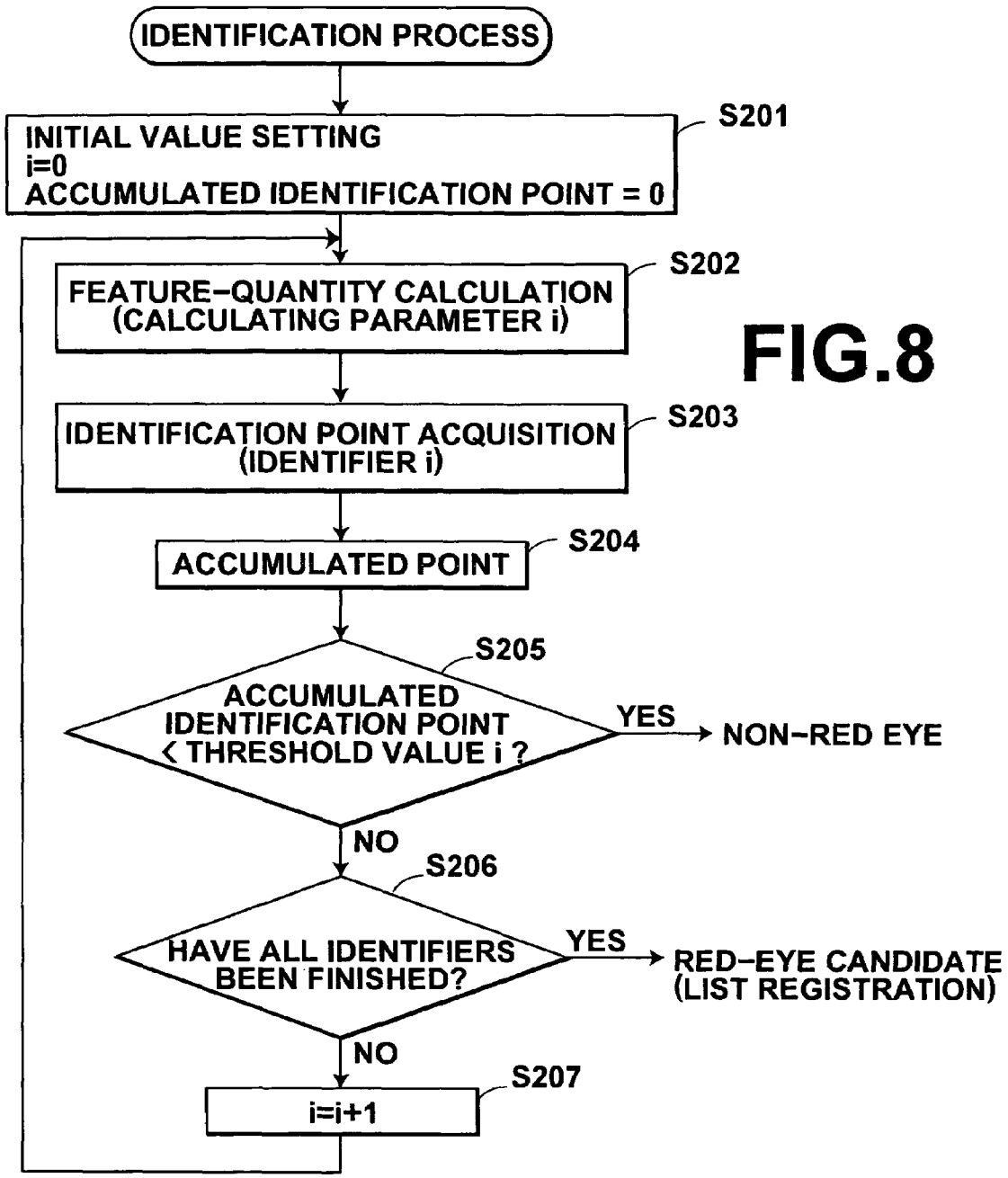
FIG. 8 is a flowchart showing the processing steps of the red-eye identification process.

FIG. 8 is a flowchart showing the processing steps of the red-eye candidate identification process performed in step S104 of FIG. 4. In the flowchart, a letter "i" is used to identify a red-eye candidate detector. In the case of N red-eye candidate detectors, the letter "i" changes from 0 to N−1 ($0 \leq i \leq N-1$). N red-eye candidate detectors, that is, parameter i, identifier i, and threshold value i ($0 \leq i \leq N-1$) are stored in memory, a hard disk, etc.

Initially, the values of the letter i and accumulated identification point are initialized to zero (S201). Then, a feature quantity of the aforementioned judging-object range 18 is calculated by using the feature-quantity calculating parameter i and the result of calculation is obtained (S202). Then, an identification point is obtained by referring to an identifier i, based on the result of calculation (S203). The identification point is added to the accumulated identification point (S204). Then, the accumulated identification point is compared with the threshold value i (S205). At this stage, if the accumulated identification point is less than the threshold value i, an image within the judging-object range 18 is judged a non-red eye.

On the other hand, if the accumulated identification point exceeds the threshold value i, whether processing has been finished for all identifiers is judged by judging whether i is N−1 (S206). When i is less than (N−1), i is increased by 1 (S207). Similarly, steps S202 to S207 are repeated. When processing has been finished for all identifiers (S206), an image within the judging-object range 18 is judged a red-eye candidate region and is registered in a candidate list.

In the preferred embodiment, the feature-quantity calculating parameter comprises reference channels ($Y, C_b, C_r,$ and $C_r^*$), feature-quantity type (pixel value itself, two-point difference, and four-point difference), and the coordinates within a judging-object range of a reference pixel.

The above-described red-eye identification process is repeatedly carried out while moving the judging-object range 18 little by little, as shown by arrows in the image 15 of FIG. 6. The setting of the judging-object range and the red-eye identification process are finished when it is judged in step S105 of FIG. 4 that scanning has been finished.

In step S106 of FIG. 4, the red-eye candidate detection section 5 judges whether processing has been finished for all resolution-classified images. If other resolution-classified images have not yet been processed, the red-eye candidate detection process returns to step S101. In step S101, the next resolution-classified image 16 is acquired and similarly processed.

That the processing is repeatedly performed on images different in resolution is for the following reasons. FIG. 6B shows the state in which the judging-object range 18 is set over the second image 16 lower in resolution than the first image 15. The judging-object range 18 is 13 pixels×13 pixels in size, as previously described. If resolution is made lower, the judging-object range 18 contains a wider range, compared with the case where resolution is high.

For example, as shown in FIGS. 6A and 6B, when the image of a pupil 19 is contained in the first image 15, there are cases where the pupil 19 not detected in the identification process performed on the first image 15 of FIG. 6A is detected in the identification process performed on the second image 16 lower in resolution than the first image 15. The information on the resolution of the image from which a red-eye candidate is detected is stored in memory, etc. Reference to that information is made by the red-eye candidate check section 8 to be described later.

Figure 9:
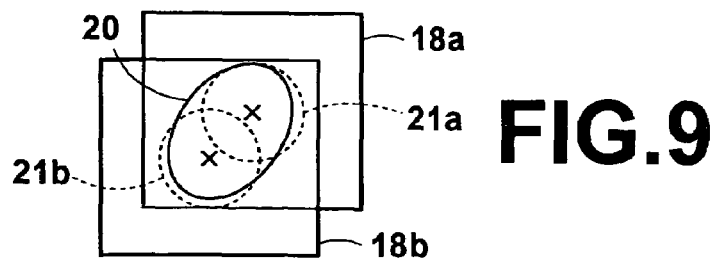
FIG. 9 is a diagram used to explain a candidate regulation process.

If it is judged in step S106 that processing has been finished for all resolution-classified images, the red-eye candidate detection section 5 carries out a candidate regulation process (S107). FIG. 9 is a diagram used for explaining the candidate regulation process. As shown in the figure, in the above-described object range set process and red-eye identification process, there are cases where a single red-eye is detected as two red-eyes.

For example, when a red-eye is an elliptic region 20 shown in FIG. 9, there are cases where a region 21a is judged as a red-eye candidate in the red-eye candidate identification process performed on a judging-object region 18a and a region 21b is judged as a red-eye candidate in the red-eye candidate identification process performed on a judging-object region

18b. In such a case, the candidate regulation process is the process of leaving as a red-eye candidate only one of the two red-eye candidates 21a and 21b that has a higher identification point, and deleting the other red-eye candidate from the candidate list.

The red-eye candidate detection section 5 outputs as a red-eye candidate list the center coordinates and sizes of red-eye candidates finally left by the above-described process.

The red-eye candidate detection process by the red-eye candidate detection section 5 is performed as described above. Referring back to FIG. 1, the results of detection of the face detection section 4 and red-eye candidate detection 5 are input to the red-eye pair specification section 6. The red-eye pair specification section 6 judges whether or not each red-eye candidate corresponds to the right eye or left eye of a person, by checking the detection result of face regions such as that shown in FIG. 3A with the detection result of red-eye candidates such as that shown in FIG. 3B. When it detects the right eye and left eye of a human face, the red-eye pair specification section 6 specifies them as a red-eye pair. For example, FIG. 3 shows the state in which both eyes of a person in the center of the photograph are specified as a red-eye pair 13. Red-eye pairs can be specified, for instance, by well-known methods such as the method described in the aforementioned Publication No. 2000-125320.

Figure 3C:
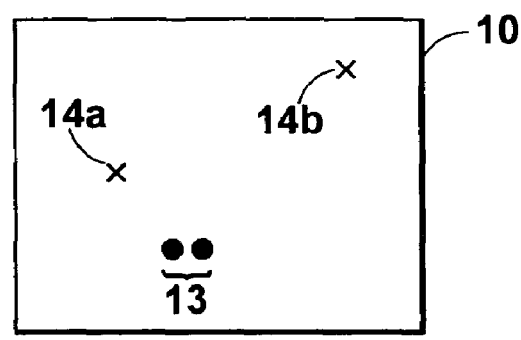
FIG. 3C is a diagram showing the state in which a red-eye pair is specified by the red-eye pair specification section of the red-eye detection device shown in FIG. 1.

In FIG. 3C, a red-eye candidate not specified as a red-eye pair is marked with a cross. In the following description, red-eye candidates not specified as a red-eye pair will be referred to as isolated red-eye candidates 14a and 14b. Information on the specified red-eye pair 13 is input to the red-eye pair candidate check section 7. On the other hand, information on the isolated red-eye candidates 14a and 14b is input to the isolated red-eye candidate check section 8.

The red-eye pair candidate check section 7 checks whether a red-eye pair candidate is a true red-eye pair, using information obtained by the face detection section 4. For example, the aforementioned Publication No. 2000-125320 discloses a method of evaluating whether a red-eye pair detected is a true red-eye pair, employing the fact that a human face is essentially symmetrical with respect to a line dividing the face into two equal parts. The red-eye pair candidate check section 7 can also employ various well-known check methods. The check method to be employed by the red-eye pair candidate check section 7 of the present invention is not particularly limited.

An isolated red-eye candidate check process by the isolated red-eye candidate check section 8 will hereinafter be described. As previously described, in prior art red-eye detection devices, red-eye candidates not detected as a pair are not checked. In contrast with this, the isolated red-eye candidate check section 8 of the present invention provides the function of checking whether a red-eye candidate not specified as a pair is a true red-eye.

Figure 10:
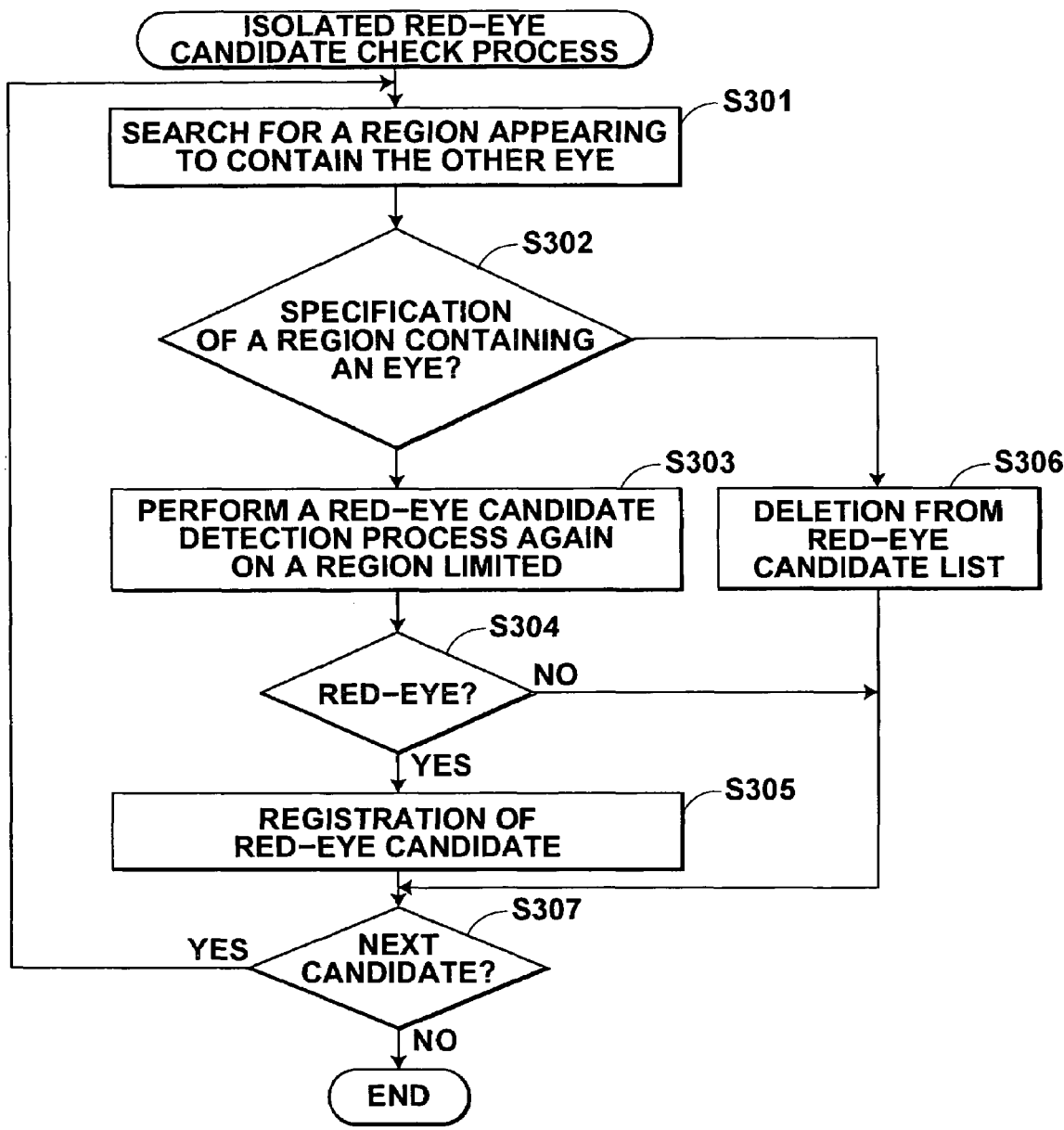
FIG. 10 is a flowchart showing the essential steps of an isolated red-eye candidate check process performed by the isolated red-eye candidate check section of the red-eye detection device shown in FIG. 1.

FIG. 10 shows the essential steps of the isolated red-eye candidate check process performed by the isolated red-eye candidate check section 8. For individual isolated red-eye candidates to be checked, the isolated red-eye candidate check section 8 first searches for a region which contains one eye that can be paired with the isolated red-eye candidate (S301). In this case, the isolated red-eye candidate check section 8 searches for an eye, not a red-eye. That is, a black eye is also included. And if a region containing the other eye of a pair cannot be specified (S302), the red-eye candidate is deleted from the red-eye candidate list (S306). At this stage, erroneously detected isolated red-eye candidates, such as electrical decorations, etc., can be removed.

If a region containing an eye can be specified, the red-eye candidate detection process is performed on each of the two regions that respectively contain an eye and a red-eye (S303). That is, for a newly specified region, the red-eye candidate detection process is performed for the first time. However, for the region containing a red-eye, the red-eye candidate detection process is performed again.

When a red-eye candidate is detected from a newly specified region (S304), the red-eye candidate is registered in the red-eye list (S305). At this stage, a red-eye that could not be detected in the first red-eye candidate detection process can be detected a new as a red-eye. On the other hand, in step S304, when a red-eye candidate is not detected, an eye in a newly specified region is estimated to be a black eye. Therefore, the red-eye list is not changed.

If the isolated red-eye candidate previously detected is detected again as a red-eye candidate in the red-eye candidate detection process of step S304, it is registered in the red-eye list (S305). In this manner, whether an isolated red-eye candidate is a true red eye can be checked.

If steps S301 to S305 or S306 are completed for a single isolated red-eye candidate, it is judged in step S307 whether a next isolated red-eye candidate is present. That is, as shown in FIG. 10, steps S301 to S305 or S306 are repeated for all isolated red-eye candidates.

Subsequently, the aforementioned step S301 in FIG. 10 will be described in further detail. FIG. 11 is a diagram used for explaining the process of searching for the other eye of an eye pair. In the searching process, as shown in the figure, a region containing an isolated red-eye candidate 14a is trimmed from the input image 10. The trimming process is performed on an image with the same resolution as that of the image from which the isolated red-eye candidate 14a is detected in the red-eye candidate detection process. When the isolated red-eye candidate 14a is estimated to be a pupil, the distance d between eyes can be estimated from the size of the pupil. Therefore, a region containing a circle of d in radius with the isolated red-eye candidate 14a as center is trimmed.

And a judging-object range 23 is set within the trimmed region 22 and undergoes an eye identification process. An eye is identified by detecting an image contained in the set judging-object range 23 with a plurality of eye detectors and then judging, from a combination of detection results obtained by the detectors, whether the image in the judging-object range 23 is an eye.

The eye detector refers to a combination of (1) a parameter for calculating a feature quantity that is effective in discriminating between an eye and an object other than an eye, (2) an identifier for outputting an identification point that represents a probability of an eye with the calculated feature quantity as input, and (3) a threshold value determined to maintain a predetermined accurate detection ratio by applying the parameter and identifier to a great number of eye samples and then calculating the value of the accumulated identification point.

The aforementioned parameter and identifier are determined by previously performing learning, using a great number of eye samples and samples representing objects other than eyes. Learning can be performed by employing well-known methods such as a neural network method known as a machine learning technique, a boosting method, etc.

Samples to be used in learning preferably include variations such as an eye with an epicanthic fold, an eye without an epicanthic fold, an eye with a small pupil, etc., as shown in FIGS. 12A, 12B, and 12C. In addition, as shown in FIG. 12D, an eye with a pupil shifted from the center may be included as an eye sample. Furthermore, a slightly inclined eye such as the one shown in FIG. 12E may be included as an eye sample so that an obliquely arranged eye can be identified. In the preferred embodiment, learning has been performing by employing samples different in angle of inclination in the range of −15 degrees to 15 degrees. In addition, learning may be performed by preparing samples that are different in a ratio of an eye region to the entire region.

The processing steps of the eye identification process are the same as those of the red-eye candidate identification process shown in FIG. 8. However, an eye may be identified by a method differing from the red-eye candidate identification process, such as a method of extracting a feature about an edge or texture, using Wavelet coefficients.

The eye identification process is repeatedly carried out while moving the judging-object range 23 little by little within the trimmed region 22. When an eye cannot be detected until scanning of the trimmed region 22 is finished, a region obtained by rotating the trimmed region 22 on the isolated red-eye candidate 14a is trimmed.

In the preferred embodiment, the trimmed region is rotated at intervals of 30 degrees. That is, the aforementioned identification process is performed on the trimmed region inclined at 30 degrees (or −30 degrees). And if an eye is not detected, the trimmed region is further rotated 30 degrees (−30 degrees) and the same process is repeated.

Inclined eyes can be detected by previously performing learning, using eye samples that are oriented at all angles of inclination. However, in the preferred embodiment, in consideration of accuracy of detection and processing time, eyes inclined in the range of −15 degrees to 15 degrees are identified by learning. Eyes inclined at angles greater than that range are identified by rotating the trimmed region.

The aforementioned trimming process, object range set process, and identification process may be performed on an image whose resolution is slightly changed. When changing resolution, it is finely adjusted by obtaining $2^{-1/4}$ times resolution, $2^{-1/4}$ times ($2^{-1/4}$ times resolution), etc., unlike the case of red-eye candidate detection. When an eye is still not detected employing other resolutions and angles of rotation, it is judged that there is no eye that can be paired with an isolated red-eye candidate.

The aforementioned step S303 shown in FIG. 10 will hereinafter be described in detail with reference to FIGS. 13 and 14. Step S303 is carried out according to the following three cases.

Figure 13A:
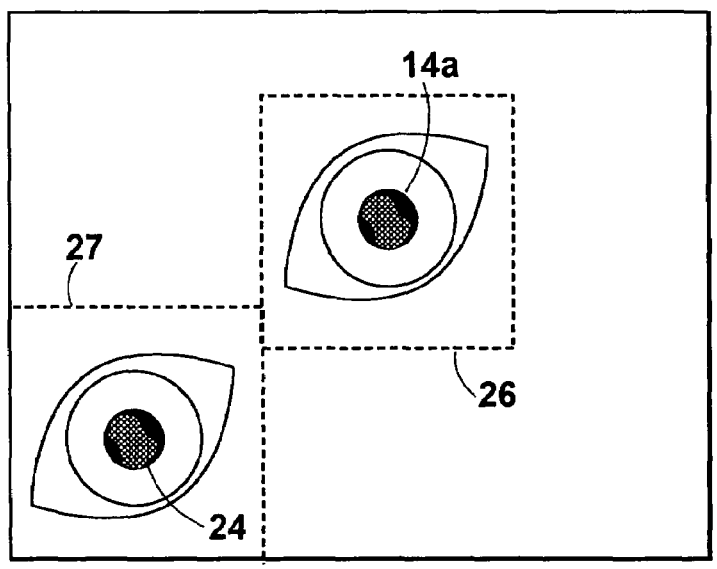
FIGS. 13A, 13B, and 13C, is a diagram used to explain a red-eye candidate detection process performed by the red-eye candidate detection section of the red-eye detection device shown in FIG. 1.
Figure 13B:
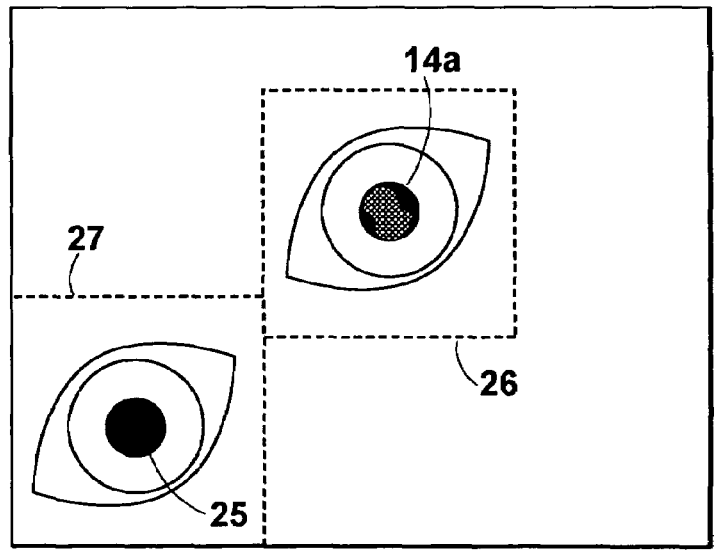
Figure 13C:
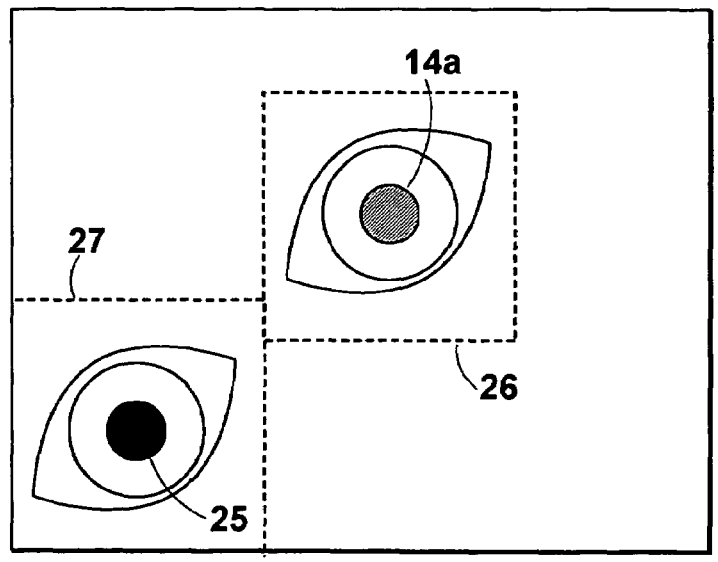

In the first case, as shown in FIG. 13A, although both eyes are red-eyes, only an isolated red-eye candidate 14a is detected by the red-eye candidate detection section 5 and the other red-eye 24 is not detected. In the second case, as shown in FIG. 13B, an isolated red-eye candidate 14a is a true red-eye, but since the other eye 25 is not a red-eye (it is a black eye), the other eye 25 is not detected by the red-eye candidate detection section 5. In the third case, an isolated red-eye candidate 14a is a black eye, but it is judged a red-eye candidate in error.

Hence, in step S303, in order to discriminate among these cases, the red-eye candidate detection process is performed again on a region 26 that contains an isolated red-eye candidate 14a, as shown in FIG. 14A. In this manner, it is checked whether the judgment of the isolated red-eye candidate 14a being a red-eye candidate was correct. Since the red-eye candidate detection process carried out here is for the purpose of checking, it requires higher accuracy than the red-eye candidate detection process carried out by the red-eye candidate detection section 5.

Therefore, in the preferred embodiment, detection is performed by employing red-eye detectors that is higher in detection performance than the detectors employed in the red-eye candidate detection section 5. If detection performance is enhanced, detection will take a longer time. However, unlike the red-eye candidate detection process carried out by the red-eye candidate detection section 5, the red-eye candidate detection process carried out in step S303 is limited in a processing range and the resolution of an image is limited to the resolution of the image from which the red-eye candidate 14a is detected. Therefore, the processing time is considered to be practically no problem.

In step S303, the red-eye candidate detection process is also performed on a region 27 that contains a new eye, as shown in FIG. 14B. In this manner, it is judged whether the eye is a red-eye or a black eye. The red-eye candidate detection process is performed on the region 27 with the same accuracy as the red-eye candidate detection process performed by the red-eye candidate detection section 5.

Red-eye detection accuracy can also be adjusted by adjusting the threshold value employed in the judgment of step S205 of the identification process shown in FIG. 8. Therefore, detection may be performed by making a difference to a threshold value between the region 26 and the region 27.

The data on a red-eye candidate, judged as a true red-eye by the red-eye pair candidate check section 7 and isolated red-eye candidate check section 8, is left and output as information on the red-eye list by the detection result output section 9.

Finally, the processing by the red-eye retouch device 2 will be briefly described. FIG. 15 shows an overview of the processing by the red-eye retouch device 2 of FIG. 1. As shown in the figure, in the preferred embodiment, the red-eye retouch device 2 extracts a pixel whose color difference $C_r$ exceeds a predetermined value, for each of the red-eyes detected by the red-eye detection device 1. Then, the red-eye retouch device 2 shapes the region by a morphology process and replaces the color of each pixel constituting the shaped region with a color suitable as the color of a pupil, such as gray with predetermined brightness.

As has been described above, the red-eye detection device in the preferred embodiment rechecks whether an isolated red-eye candidate not recognized as a red-eye pair is a red-eye. Therefore, the red-eye detection device is capable of accurately detecting only red-eyes even when only one eye is a red-eye, when in the first red-eye candidate detection only one eye is detected and the other eye is not detected, or when in the first red-eye candidate detection a black eye or electrical decoration is erroneously detected as a red-eye, as well as when both eyes are red-eyes.

Note that the present invention is characterized by rechecking whether an isolated red-eye candidate not recognized as a red-eye pair is a red-eye. Therefore, detection of red-eye candidates and checking are not to be limited to the aforementioned embodiment, but may adopt other methods.

For example, in the aforementioned embodiment, the isolated red-eye candidate check section 8 searches for the other eye, using eye detectors. However, a region appearing to contain the other eye may be specified, by inputting the detection result of the face detection section 4 to the isolated red-eye candidate check section 8 and using information on the face size, distance between both eyes, etc. By combining the specification of a region based on face detection results and the detection by eye detectors together, a search for the other eye may also be conducted.

In addition, an alternate method of checking, performed by the isolated red eye candidate check section 8, in which information regarding the other eye is not utilized, may be considered. For example, in the embodiment described above, the red eye candidate detecting process is administered on regions 26 and 27, as described with reference to FIG. 13. Alternatively, red eye candidate detecting processes having high accuracy may be executed, with only the isolated red eye candidate 14a as a subject, or with only the region 26 that includes the isolated red eye candidate 14a as a subject. For example, whether the color within an isolated red eye candidate (the region detected as an isolated red eye candidate) is red may be confirmed. As another example, whether an isolated red eye candidate is true red eye can be checked, by obtaining the brightness distribution of the isolated red eye candidate. The brightness distribution within a region of a predetermined size that includes the isolated red eye candidate may be referred to. In the case that the isolated red eye candidate is a true red eye, a characteristic brightness distribution is observed. Therefore, judgment regarding whether the isolated red eye candidate is a true red eye can be made based on the brightness distribution.

In addition, the isolated red eye candidate check section 8 may employ one of a plurality of checking methods as needed. For example, simple methods may be employed in the case that the candidate detected by the red eye candidate detection section 5 has a high probability of being true red eye. More accurate checking methods may be employed in the case that the probability that the candidate is true red eye is low, and it is necessary to carefully judge whether the candidate is true red eye. Fr example, the red eye candidate detection section 5 of the embodiment described above judges whether candidates are red eyes, by comparing the accumulated identification point value against a threshold value, as described with reference to FIG. 8. In this case, if the accumulated identification point value far exceeds the threshold value, the probability that the candidate is true red eye is high. In contrast, if the accumulated identification point value slightly exceeds the threshold value, the probability that the candidate is true red eye is low. Therefore, appropriate checking methods may be employed, based on the accumulated identification point value when a candidate is judged to be an isolated red eye.

Further, the isolated red eye check section 8 may employ combinations of a plurality of checking methods. For example, a single method may be employed in the case that the candidate detected by the red eye candidate detection section 5 has a high probability of being true red eye. A plurality of checking methods may be employed in a stepwise manner in the case that the probability that the candidate is true red eye is low, and it is necessary to carefully judge whether the candidate is true red eye. The combinations of checking methods may be determined, based on the accumulated identification point values in these cases as well.

The processes performed by the red eye retouch device 2 are not limited to those described in the above embodiment. For example, one of a plurality of correcting methods may be employed by the red eye retouch device 2, during retouching of red eyes. Alternatively, combinations of a plurality of correcting methods may be employed by the red eye retouch device 2. The correcting method employed by the red eye retouch device 2 may be determined, based on the checking method employed by the isolated red eye candidate check section 8.

What is claimed is:

1. A red-eye detection device for detecting from an image at least one red-eye in which at least part of a pupil is displayed red, comprising:
  a red-eye candidate detection section for detecting at least one red-eye candidate that can be estimated to be said red-eye, by identifying a feature of the pupil that has a region displayed red from among features of said image;
  a red-eye pair specification section for specifying red-eye candidates detected by said red-eye candidate detection section, as a pair of a right red-eye candidate equivalent to a right eye and a left red-eye candidate equivalent to a left eye, using information on a face region obtained from said image; and
  an isolated red-eye candidate check section for checking whether an isolated red-eye candidate, detected by said red-eye candidate detection section but not specified as said pair by said red-eye pair specification section, is a true red-eye.

2. The red-eye detection device as set forth in claim 1, wherein said isolated red-eye candidate check section checks whether said isolated red-eye candidate is a true red-eye, by whether a feature of an eye can be identified from among features of an image containing said isolated red-eye candidate.

3. The red-eye detection device as set forth in claim 1, wherein said isolated red-eye candidate check section checks whether said isolated red-eye candidate is a true red-eye, by whether the feature of the pupil having a region displayed red can be re-identified from among features of an image containing said isolated red-eye candidate.

4. The red-eye detection device as set forth in claim 3, wherein said re-identification by said isolated red-eye candidate check section is higher in accuracy of identification than said identification by said red-eye candidate detection section.

5. A red-eye detection method of detecting from an image at least one red-eye in which at least part of a pupil is displayed red, comprising:
  a red-eye candidate detection step of detecting at least one red-eye candidate that can be estimated to be said red-eye, by identifying a feature of the pupil that has a region displayed red from among features of said image;
  a red-eye pair specification step of specifying red-eye candidates detected by said red-eye candidate detection step, as a pair of a right red-eye candidate equivalent to a right eye and a left red-eye candidate equivalent to a left eye, using information on a face region obtained from said image; and
  an isolated red-eye candidate check step of checking whether an isolated red-eye candidate, detected as said red-eye candidate but not specified as said pair, is a true red-eye.

6. The red-eye detection method as set forth in claim 5, wherein in said isolated red-eye candidate check step, whether said isolated red-eye candidate is a true red-eye is checked by whether a feature of an eye can be identified from among features of an image containing said isolated red-eye candidate.

7. The red-eye detection method as set forth in claim 5, wherein in said isolated red-eye candidate check step, whether said isolated red-eye candidate is a true red-eye is checked by whether the feature of the pupil having a region displayed red can be re-identified from among features of an image containing said isolated red-eye candidate.

8. The red-eye detection method as set forth in claim 7, wherein said re-identification in said isolated red-eye candidate check step is higher in accuracy of identification than said identification in said red-eye candidate detection step.

9. A computer-readable storage medium having a red-eye detection program for causing a computer to carry out a process of detecting from an image a red-eye in which at least part of the pupil is displayed red recorded therein, said program causing said computer to carry out;

a red-eye candidate detection process of detecting at least one red-eye candidate that can be estimated to be said red-eye, by identifying a feature of the pupil that has a region displayed red from among features of said image;

a red-eye pair specification process of specifying red-eye candidates detected by said red-eye candidate detection process, as a pair of a right red-eye candidate equivalent to a right eye and a left red-eye candidate equivalent to a left eye, using information on a face region obtained from said image; and an isolated red-eye candidate check process of checking whether an isolated red-eye candidate, detected as said red-eye candidate but not specified as said pair, is a true red-eye.

10. The computer-readable storage medium as set forth in claim 9, wherein said isolated red-eye candidate check process is a process of checking whether said isolated red-eye candidate is a true red-eye, by whether a feature of an eye can be identified from among features of an image containing said isolated red-eye candidate.

11. The computer-readable storage medium as set forth in claim 9, wherein said isolated red-eye candidate check process is a process of checking whether said isolated red-eye candidate is a true red-eye, by whether the feature of the pupil having a region displayed red can be re-identified from among features of an image containing said isolated red-eye candidate.

12. The computer-readable storage medium as set forth in claim 11, wherein said re-identification in said isolated red-eye candidate check process is higher in accuracy of identification than said identification in said red-eye candidate detection process.

* * * * *